(No Model.)
A. W. STIEFEL.
SAFETY CAR FENDER.
No. 518,796. Patented Apr. 24, 1894.
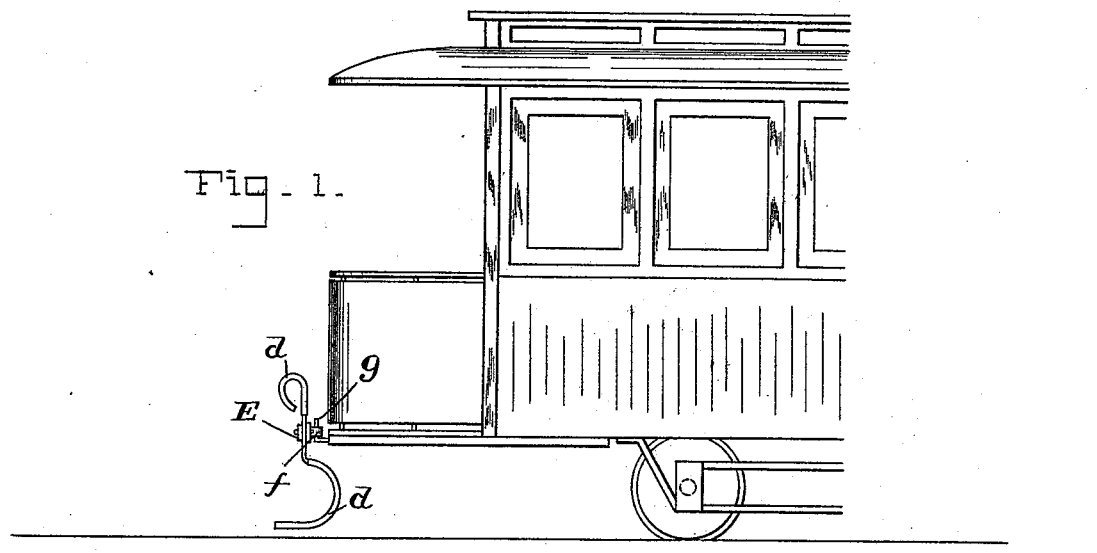
Fig. 1.
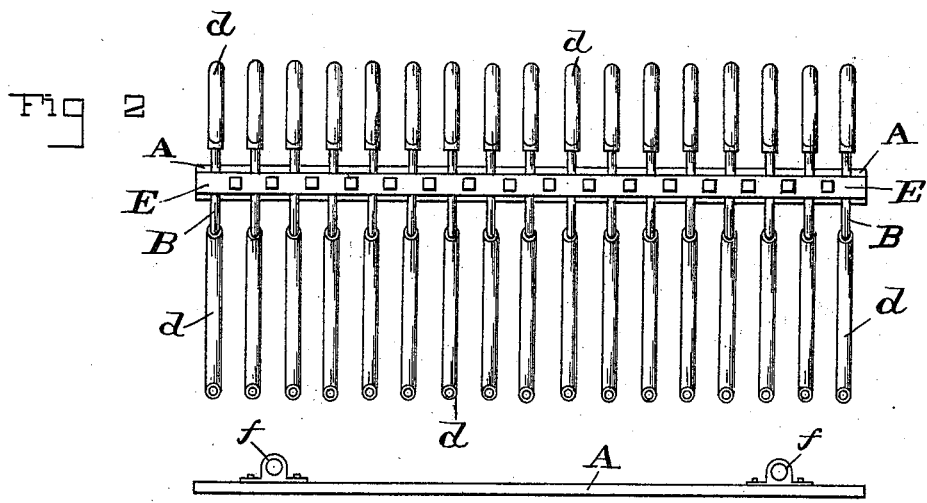
Fig. 2.
Fig. 3.
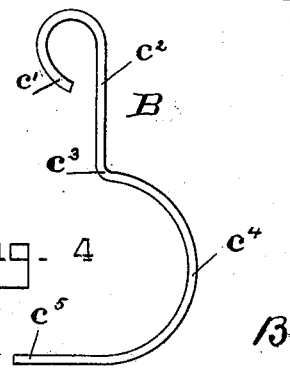
Fig. 4
WITNESSES :—
L. I. Van Horn.
Charles B. Mann Jr.
INVENTOR :—
A. W. Stiefel
By Chas. B. Mann
ATTORNEY.
THE NATIONAL LITHOGRAPHING COMPANY,
WASHINGTON, D. C.

UNITED STATES PATENT OFFICE.

AUGUST W. STIEFEL, OF BALTIMORE, MARYLAND.

SAFETY CAR-FENDER.

SPECIFICATION forming part of Letters Patent No. 518,796, dated April 24, 1894.

Application filed January 31, 1894. Serial No. 498,555. (No model.)

*To all whom it may concern:*

Be it known that I, AUGUST W. STIEFEL, a citizen of the United States, residing at Baltimore, in the State of Maryland, have invented certain new and useful Improvements in Safety Car-Fenders, of which the following is a specification.

My invention relates to a safety fender for street cars.

The object is to provide a device that will save a person who may be run down by a car, from injury in the collision, and also prevent him from getting under the wheels.

The invention is illustrated in the accompanying drawings, in which—

Figure 1 is a side view of part of a car with the improved fender attached. Fig. 2 is a front view of the fender. Fig. 3 is a top view of the cross bar to which the spring arms are attached. Fig. 4 is a view of one spring arm.

The letter, A, designates a horizontal cross-bar, and spring metal arms, B, of certain shape are attached thereto. These arms and their peculiar shape constitute one of the leading features of the invention. The upper end of each arm has a down-curved pendent end, $c'$, forming a spring buffer; commencing at this end the arm curves over and down, forming a vertical part, $c^2$; at the lower end of the vertical part is an angle or bend, $c^3$, to rearward; and from said angle or bend the arm forms a rearward semi-circular curve, $c^4$, the lower part of which terminates in a horizontal forward-pointing end, $c^5$. The semi-circular curve, $c^4$, and the horizontal end, $c^5$, form a spring-arm, and when a number of these are assembled together and each one secured by its vertical part, $c^2$, to the cross-bar, A, they together form a receptacle,—the horizontal ends, $c^5$, forming a sort of platform. The several down-curved pendent ends, $c'$, together form a horizontal spring-buffer. The said ends, $c'$, and also the semi-circular curved parts, $c^4$, are sheathed or covered with a rubber sleeve, $d$, to cushion it.

In operation if a person falls against the fender the spring-buffers, $c'$, will save him from injury; and the horizontal forward-pointing ends, $c^5$, will prevent him from getting under the wheels, while the platform formed by these ends will support him. Any desired fastening may be employed to secure the vertical parts, $c^2$, to the cross-bar, A; in the present instance a clamp-bar, E, extends over the parts, $c^2$, and is bolted to the bar, A. The back of the cross-bar has two eyes, $f$, which take onto hooks, $g$, on the car, and thus the fender is supported.

For the purpose of illustration I have shown my fender attached to the front of the car, but I design it to be attached to the car-truck which is not mounted on springs as the car-body is. By attaching it to the truck, the lower portion of the fender, that is, the horizontal forward-pointing ends, $c^5$, will always have the same height above the surface of the street, and it may be set down low enough to prevent any one, even a small child, from getting below it.

Having thus described my invention, what I claim is—

A safety fender for cars, comprising a number of spring-metal arms each having at its upper part a forward down-curved pendent end, $c'$, which forms a spring-buffer, below said spring buffer a vertical part, $c^2$, and at the lower end of said vertical part a rearward semi-circular curve, $c^4$, the lower part of which terminates in a horizontal forward-pointing end, $c^5$; in combination with a cross-bar, A, to which each spring-metal arm is secured by its said vertical part, $c^2$.

In testimony whereof I affix my signature in the presence of two witnesses.

AUGUST W. STIEFEL.

Witnesses:
F. W. FELDNER,
CHARLES B. MANN, Jr.